Patented Apr. 29, 1952

2,595,184

UNITED STATES PATENT OFFICE 2,595,184

METHOD FOR CONSOLIDATING OR FOR PLUGGING SANDS

Gilbert G. Wrightsman, Houston, Tex., assignor, by mesne assignments, to Standard Oil Development Company, Elizabeth, N. J., a corporation of Delaware No Drawing. Application October 31, 1946, Serial No. 707,027

7 Claims. (Cl. 61—36)

The present invention is directed to a method for treating formations traversed by a borehole. More particularly, the present invention is directed to a method for altering the characteristics of a formation penetrated by a borehole involving the introduction into the formation of a liquid agent capable of being converted into a solid.

It is conventional to the art to exploit a subterranean liquid reservoir by drilling boreholes from the surface of the earth into the reservoir. The formations through which the borehole extends may have characteristics which render it difficult to exploit effectively the reservoir and which it is desirable to alter in order to obtain more satisfactory results in the production of the desired fluid. For example, the reservoir may consist of a porous stratum having a body of oil with a body of water underlying and a body of gas overlying the body of oil and in order to withdraw the oil effectively it may be desirable to render the stratum impervious at the water-oil interface, at the gas-oil interface or at both the gas-oil and water-oil interfaces. As another example, the producing formation may not be sufficiently consolidated and as a result when producing fluid therefrom, particles of the formation are carried into the borehole; in such instances it may be desirable to consolidate the formation adjacent the borehole without substantially decreasing the porosity thereof.

Heretofore, a variety of agents has been introduced into formations to seal or plug the formations. As an example, a liquid capable of forming a solid resin under the influence of a catalyst at the temperature of the formation has been injected into a formation producing oil and water for the purpose of forming a water and oil insoluble resin. It has also been conventional to force into a selected stratum of a formation a slurry of Portland cement under extremely high pressure whereby the cement solidifies to prevent migration of an undesired liquid from one part of the formation to another part of the formation adjacent the borehole. Such resin forming liquids are extremely viscous liquids and the cement slurries are viscous suspensions; accordingly, extremely high pressures are required to force such materials from the borehole into the formation to be treated.

I have discovered that, when an unsubstituted highly aromatic compound, i. e., an hydroxy aromatic compound having no alkyl group substituted on the aromatic nucleus and containing not more than 14 carbon atoms in the molecule, is admixed with a molecular excess of an aqueous solution of formaldehyde and with a highly ionizable alkaline-reacting hydroxide in a concentration within the range of about 2% to 10% by weight, a low viscosity, Newtonian fluid composition is formed which remains homogeneous during reaction. I have also discovered that this composition, when subjected to temperatures moderately elevated above room temperatures for 3 to 5 hours, is uniformly converted into a gel without separation of liquid or solid phases. Upon further heating, the resulting gel is converted into a tough water-insoluble, oil-insoluble solid.

It is an object of the present invention to treat formations to change the characteristics thereof by employing a composition of low viscosity which can be readily forced into a semi-permeable formation and is capable of hardening therein to form a solid oil insoluble and water insoluble resin.

According to the present invention, the original characteristics of a formation are altered by introducing therein an aqueous solution comprising unsubstituted hydroxy aromatic compound containing not more than 14 carbon atoms in a molecule, a molecular excess of formalin over that capable of reacting with the hydroxy aromatic compound, and a highly ionizable alkaline-reacting hydroxide and maintaining the mixture in place within the formation to allow it to form a resin therein. The ingredients listed may be formed into a homogeneous mixture at the surface of the earth and subsequently introduced into the borehole and forced into the selected formation.

Alternatively, the individual liquid components of the mixture may be separately introduced into the borehole and intimately mixed therein by suitable agitating means, such as a mixing nozzle at the end of a string of tubing, and after admixture the solution may be forced from the bore of the well into the selected formation. After the mixture has been introduced into the selected formation it is maintained therein at a pressure at least slightly in excess of the normal pressure of the formation for a sufficient time to allow components to solidify to form a resin.

The composition employed for treating formations in accordance with the present invention is a true Newtonian fluid having a viscosity of the order of 4 or 5 centipoises at 80° F. and capable of solidifying to form an insoluble, hard, tough mass, at the temperature encountered in the formation treated, within 3 to 5 hours after forming the composition.

As heretofore stated, the composition introduced into the formation to be treated is an aqueous solution comprising unsubstituted hydroxy aromatic compound containing not more than 14 carbon atoms in the molecule, formaldehyde and a highly ionizable alkaline reacting hydroxide. Specific examples of suitable unsubstituted hydroxy compounds suitable for use in the composition are phenol, resorcinol, alpha-naphthol, pyrogallol, phloro-glucinol and alizarin. The strongly alkaline material may be selected from the group of alkali hydroxides, alkaline earth hydroxides and quaternary amines; specific examples of such compounds are sodium hydroxide, potassium hydroxide, calcium hydroxide, barium hydroxide and tetra-ethyl ammonium hydroxide. The formaldehyde should be present in the composition in a molecular excess relative to the unsubstituted hydroxy aromatic compound. The strongly alkaline catalyst may be present in an amount within the range of 2 to 10% by weight. It will be understood that the unsubstituted hydroxy aromatic compound and formaldehyde may be admixed without the initiation of a reaction but upon the addition of a strongly alkaline catalyst thereto a mixture is formed having a low viscosity and which reacts at formation temperatures within a period of 3 to 5 hours whereby the mixture is first converted to a gel and subsequently to a tough, insoluble solid. It is to be emphasized that the low viscosity mixture is converted into a gel and subsequently into a solid without separation into a plurality of phases.

In one modification for the practice of the present invention the resin forming mixture is forced into a subterranean permeable strata to form a disc concentric around the borehole and the mixture maintained within the formation to solidify and form a solid disc-like impermeable barrier. The low viscosity of the composition employed enables it readily to penetrate permeable formations whereby the disc may readily be made to extend within the range of 7 to 10 feet into the formation in all directions around the borehole.

As another modification for the practice of the present invention the low viscosity resin-forming mixture may be employed for consolidating a producing formation. In this modification the low viscosity resin-forming material may be forced from the borehole into the formation as desired and fluid then induced to flow through the formation to open up passages between the particles of the formation while leaving sufficient resin-forming mixture within the formation to bind the particles into a consolidated mass. When practicing this procedure, the resin-forming mixture may be forced into a selected formation and subsequently followed by a neutral liquid, such as oil or water, to flush the resin-forming material from the interstices between the sand grains to leave them open for fluid flow. It will be understood that it is impossible to remove completely any fluid from the sand by flowing a dissimilar material through the sand and the effect of the flushing liquid is to remove resin-forming composition from passages between the sand grains leaving a film of resin-forming composition on the grains. A sufficient amount of the flushing liquid is forced through the formation to prevent the setting up of a solid barrier of the resin at any one point in the formation. As the resin is forced outwardly from the formation it will coat the grains of formation and the utilization of sufficient flushing fluid will cause the clearing of the passages throughout the treated portion of the formation, leaving the consolidating material as a film on the grains. As a feature of safety, it is usually desirable to use 3 or 4 times as much flushing material as is theoretically necessary to insure the retention of suitable permeability by the formation.

After forcing the neutral liquid into the formation, the direction of flow may be reversed and production allowed at a relatively slow rate to retain the porosity of the formation while the injected material is reacting to form a hard resin. After a suitable time has elapsed to allow the resin to form, the well may be allowed to produce at any desired rate or closed in, at the option of the operator.

In preparing the composition employed for treating formations in accordance with the present invention it is preferred to employ from 50 to 80 parts of formaldehyde by weight in admixture with from 20 to 50 parts by weight of unsubstituted hydroxy aromatic compound. The strongly alkaline catalyst may be present in the composition in an amount within the range of 2% to 10% by weight.

As an example illustrating more specifically the practice of the present invention, it may be stated that when treating formations to form an impermeable shield between gas-oil contact or between the water-oil contact it is preferred to cement a string of casing in the borehole and to perforate the casing at a small interval, as within the range of 6 inches to one foot, at the selected contact and inject the resin-forming material in an amount within the range of 4 to 8 barrels through the perforations into the formation. When employing an amount of mixture within the range above given, the mixture will allow 5 to 7 feet of penetration of sand per foot of exposed formation within the resultant formation to form an impermeable shield within the formation having a radius within the range of 5 to 7 feet.

It will be obvious to a workman skilled in the art that the method of the present invention enjoys a number of advantages over the methods of treating formation conventional to the art. When attempting to render formations impermeable by the use of Portland cement, a viscous slurry of solid suspended in a liquid vehicle is used and the characteristics of the slurry are that the solid materials filter out on the surface of permeable formations in which the liquid vehicle may enter. If it is desired to force the cement into a formation by the use of the technique known as "squeeze cementing," high pressures at the surface must be employed. Similarly, the resin-forming materials conventionally employed for plugging and consolidating formations usually have a viscosity in the range of 250 to 350 centipoises at 80° F. with the viscosity rarely below 250 centipoises and at times as great as 700 centipoises. The advantages of treating formation in accordance with the present invention with a true Newtonian fluid having a viscosity of approximately 4 to 5 centipoises at 80° F. and capable of solidifying to form an insoluble, tough, hard mass within a time interval of 3 to 5 hours under the usual temperature conditions encountered when treating subsurface formations will be obvious.

While I have described specific examples illustrating the practice of the present invention it will be apparent to a workman skilled in the art that various changes may be made without departing from the scope of the invention.

Having fully described and illustrated the practice of the present invention, what I desire to claim as new and useful and to secure by Letters Patent is:

1. In a method for treating porous, earth-like formations to solidify the same, the improvement which includes the steps of forming a substantially non-viscous fluid consisting essentially of formaldehyde, unsubstituted hydroxy aromatic compound, and a strongly alkaline catalyst in a concentration within the range of about 2% to 10% by weight of the fluid, said fluid being an aqueous solution which remains homogeneous during reaction, introducing said non-viscous fluid into the formation to be solidified, and maintaining the fluid in said formation to form a resin therein.

2. In a method for plugging subsurface earth formations to render the same impermeable, the improvement, which includes the steps of forming a substantially non-viscous fluid consisting essentially of formaldehyde, unsubstituted hydroxy aromatic compound, and a strongly alkaline catalyst in a concentration within the range of 2% to 10%, said fluid being an aqueous solution which remains homogeneous during reaction, introducing said fluid into a subsurface earth formation, and maintaining said fluid as a body within the formation to form an insoluble, solid, impervious resin therein.

3. The improvement in accordance with claim 2 wherein the unsubstituted hydroxy aromatic compound is phenol.

4. The improvement in accordance with claim 2 wherein the unsubstituted hydroxy aromatic compound is phenol and the ratio of formaldehyde to phenol is within the range of 1:1 to 4:1.

5. In a method for consolidating permeable subsurface earth formations, the improvement which includes the steps of forming a substantially non-viscous fluid composition consisting essentially of formaldehyde, an unsubstituted hydroxy aromatic compound, and a strongly alkaline catalyst in a concentration within the range of about 2% and 10% by weight of the fluid, said composition being an aqueous solution which remains homogeneous during reaction, introducing said composition into a permeable subsurface earth formation, subsequently forcing a neutral fluid through at least a portion of the formation in which the composition has been introduced whereby to form passages throughout said portion of the formation, and maintaining the composition in said portion of the formation to form a hard, impervious bond between particles of the formation while maintaining a substantial portion of the initial permeability thereof.

6. The improvement in accordance with claim 5 wherein the unsubstituted hydroxy aromatic compound is phenol.

7. The improvement in accordance with claim 5 wherein the unsubstituted hydroxy aromatic compound is phenol and the ratio of formaldehyde to phenol is within the range of 1:1 to 4:1.

GILBERT G. WRIGHTSMAN.

REFERENCES CITED

The following references are of record in the file of this patent:

UNITED STATES PATENTS

| Number | Name | Date |
|---|---|---|
| 1,019,407 | Baekeland | Mar. 5, 1912 |
| 1,160,363 | Baekeland | Nov. 16, 1915 |
| 2,300,325 | Leeuwen | Oct. 27, 1942 |